United States Patent Office 3,361,773
Patented Jan. 2, 1968

3,361,773
1α-METHYL STEROIDS
Rudolf Wiechert, Berlin-Lichterfelde, Germany, assignor to Schering A.G., Berlin, Germany
No Drawing. Filed Mar. 24, 1961, Ser. No. 98,026
Claims priority, application Germany, Apr. 6, 1960, Sch 27,696; July 21, 1960, Sch 28,196; Dec. 23, 1960, Sch 28,955
12 Claims. (Cl. 260—397.4)

The present invention relates to 1α-methyl steroids, and more particularly to 1α-methyl-3-ketosteroids and to methods of producing the same.

German Patent No. 1,023,764 describes the hydrogenation of 1-methyl-Δ¹-3-ketosteroids produced by decomposition of diazomethane addition products of Δ¹-3-ketosteroids, the hydrogenation being carried out by normal methods. Since the hydrogen enters the steroid molecule by this hydrogenation due to steric influences at the back of the steroid molecule the resulting compound is a 1β-methyl-3-ketosteroid. Corresponding 1α-methyl-3-ketosteroids were not produced prior to the present invention.

It is accordingly a primary object of the present invention to provide for the production of 1α-methyl-3-ketosteroids.

It is another object of the present invention to provide a new series of compounds, namely 1α-methyl-3-ketosteroids which have valuable properties as intermediates in the production of other useful steroids, and which are themselves valuable for various pharmacological purposes, which are in general the same pharmacological purposes as for the corresponding steroids which do not contain a 1α-methyl group, however, the compounds of the present invention having improved activities in this respect.

The present invention also provides for various methods of producing not only the new 1α-methyl-steroids which are specifically claimed herein, but also methods which are generally applicable to the production of any 1α-methyl-3-ketosteroid.

Other objects and advantages of the present invention will be apparent from a further reading of the specification and of the appended claims.

With the above and other objects in view, the present invention mainly comprises a compound of the formula:

(I)
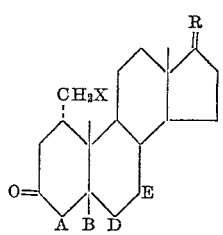

wherein X is selected from the group consisting of hydrogen and halogen, wherein

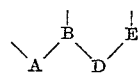

is selected from the group consisting of

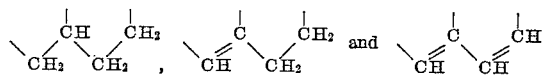

and wherein R is selected from the group consisting of

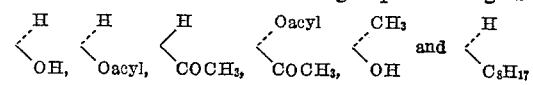

wherein acyl is derived from a lower aliphatic carboxylic acid.

As indicated above, one of the primary objects of the present invention is to provide for the production of the new 1α-methyl-3-ketosteroids which are set forth above.

It is still another object of the present invention to provide methods which can be used not only for the production of the particular 1α-methyl-3-ketosteroids set forth above, but which are actually generally applicable to the production of any 1α-methyl-3-ketosteroid. These methods will be further discussed below and it will be seen that although for purposes of convenience specific reference is had to the production of compounds of the above set forth general formula, that the methods are equally applicable to the production of other 1α-methyl-3-ketosteroids, and in fact to any 1α-methyl-3-ketosteroids.

In accordance with one method of embodiment of the present invention it has been found if the cyclopropane ring of a 1,2α-methylene-3-ketosteroid is opened with a hydrogen halide acid the resulting compound is a 1α-halomethyl-3-ketosteroid which can be dehalogenated by hydrogenation to produce the corresponding 1α-methyl-3-ketosteroid. The reaction proceeds in accordance with the following equations:

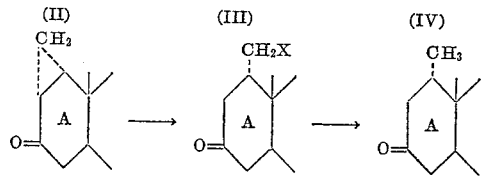

Suitable starting materials of this method are described in German Patent No. 1,072,991 and German Patent No. 1,096,353. Starting compounds for this method may also be produced according to the method of German Patent No. 1,023,764 and U.S. patent application Ser. No. 73,495 filed Dec. 5, 1960, now U.S. Patent No. 3,134,792, by Emanuel Kaspar et al. According to the method set forth therein 1,2-methylene-3-ketosteroids are obtained as side products along with the primarily produced products 1-methyl-Δ¹-3-ketosteroids, the 1,2 - methylene-3-ketosteroids being obtained in relatively considerable amount. Accordingly, the method of the present invention which provides for the conversion of 1,2-methylene-3-ketosteroids into 1α-methyl-3-ketosteroids which are extremely valuable products, as will be further discussed below, is a technically valuable method in that it makes use of a side product.

According to another method embodiment of the present invention the desired 1α-methyl-3-ketosteroids are obtained in another manner starting from the same 1,2α-methylene-3-ketosteroids, not by treatment with a hydrohalic acid as described above, but by opening the cyclopropane ring of the mentioned 1,2-methylene-3-ketosteroids by catalytically directed hydrogen, preferably in the presence of a platinum catalyst in glacial acetic acid. This results in the production of the 1α-methyl-3-hydroxyl-steroid since the hydrogenation results simultaneously in the reduction of the 3-keto group to the corresponding secondary alcohol group, which latter may then be reconverted by oxidation into the keto group in known manner, for example by means of chromic acid or in accordance with the Oppenauer method, if the keto steroid is desired as the final product. This method of proceeding is summarized by the following reaction mechanism:

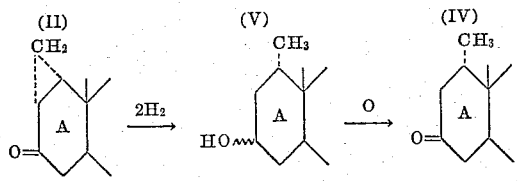

In accordance with still another embodiment of the present invention 1α-methyl-3-ketosteroids can be produced directly from the corresponding Δ¹-3-ketosteroids by reaction with methylmagnesiumhalide in the presence of cuprous chloride. It has been found that this Grignard reagent quite surprisingly does not react in the normal manner with the 3-keto group. Instead the reaction which occurs is a 1,4-addition of the Grignard reagent onto the Δ¹-3-keto group (the so-called anomalous Grignard reaction) and by further normal working up of the Grignardation mixture the desired 1α-methyl steroid is obtained. The reaction mechanism is as follows:

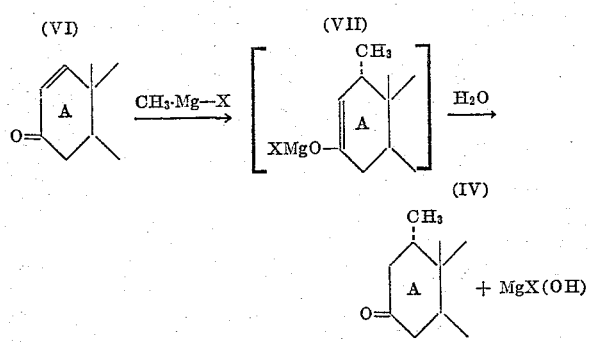

This last described method of proceeding is distinguished by its simplicity. This method saves an entire series of reaction stages, which becomes more clearly apparent, when it is remembered that in the first two methods variations set forth above the starting material i.e. 1,2α-methylene compounds are obtained in relatively moderate yields in multistage methods from the corresponding Δ¹-3-ketosteroids, in some cases even by a wide detour from the corresponding Δ¹,⁴,⁶-3-ketosteroids.

The possibility of utilizing the anomalous Grignard reaction in accordance with the present invention could not certainly be predicted although it is known that Grignardation of α,β-unsaturated ketosteroids occasionally gives rise to an anomalous course of reaction. Comparison may be made for example with the conversion of Δ¹⁶-20-ketosteroids to 16α-methyl-20-ketosteroids (Helv. Chimica Acta 42 [1959], page 2043). Since the Δ¹⁶-20-ketosteroid in many reactions exhibits behavior which deviates from that of the α,β-unsaturated 3-ketosteroids (in the reaction with haloforms in the presence of potassium tertiary butylate the Δ¹-3-ketosteroid behaves in a different manner from the Δ¹⁶-20-ketosteroid, and it has also been noted that the 18-Nor-Δ¹²-11-ketosteroid in the presence of cuprous chloride does not give a 1,4-addition with methylmagnesium iodide) it could not be predicted that Δ¹-3-ketosteroids and Δ¹⁶-20-ketosteroids would react in a comparable manner with Grignard reagents.

All three method variations have as a basis the treatment finally of Δ¹-3-ketosteroids with such agents which with saturation of the Δ¹-double bond are adapted to bind a methyl group or a group convertible to a methyl group with the carbon atom 1 standing β to the keto group, and if necessary the group convertible to the methyl group is subsequently converted to the methyl group. All of this is illustrated by the following general reaction scheme:

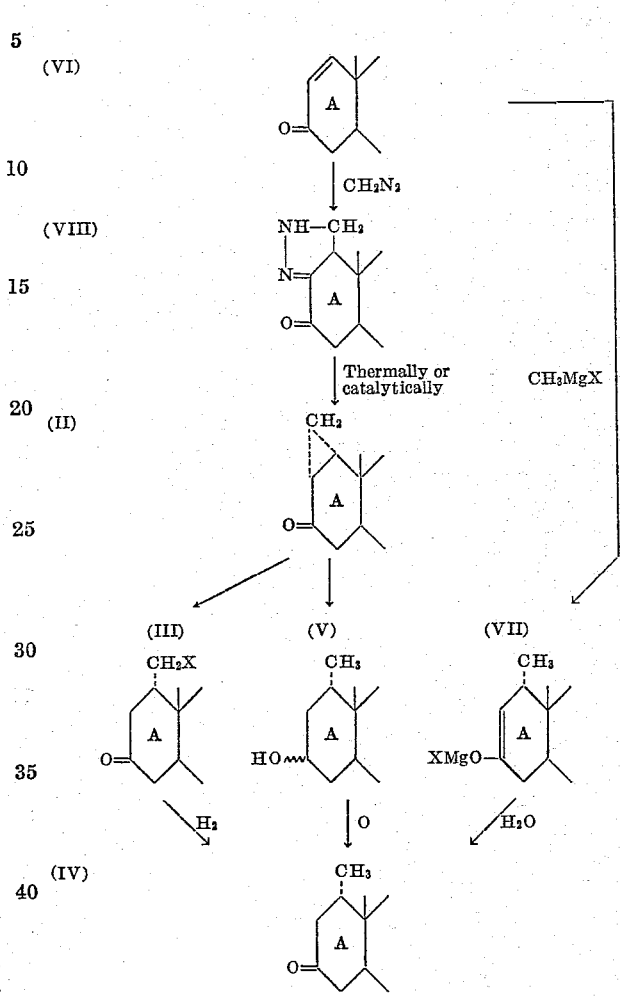

The method of the present invention is applicable, as indicated above, to all Δ¹-3-ketosteroids or their primary addition products, and these steroids can also contain various other substituents in various places of the molecule, for example substituents in 6,9,11,16 and 17-position of the molecule, such substituents being, for example, hydrocarbon radicals, halogens or hydroxyl groups either in free, esterified or etherified condition. Furthermore, in the 17-position there can be an acetyl group or a ketol side chain. In the case of the procedure with the Grignard reagent reactable groups such as a 20-keto group should first in known manner be blocked or protected, for example by prior acetalisation thereof.

A special discussion follows with respect to the presence of additional double bonds. The additional presence of a Δ⁴-double bond practically prevents the addition of the diazomethane and the Grignard reagent onto the Δ¹-double bond, while this reaction proceeds normally as described above with the still further presence with the Δ⁴-double bond of a Δ⁶-double bond. The primary addition products of Δ¹,⁴,⁶-3-ketosteroids have particular value for the method of the present invention since it is possible from its primary intermediate or end product, as illustrated in the following examples, in a smooth reaction to eliminate the Δ⁶-double bond by selective hydrogenation. In this manner it is possible to arrive at the very valuable 1α-methyl-Δ⁴-3-ketosteroids. This is illustrated in the following reaction scheme:

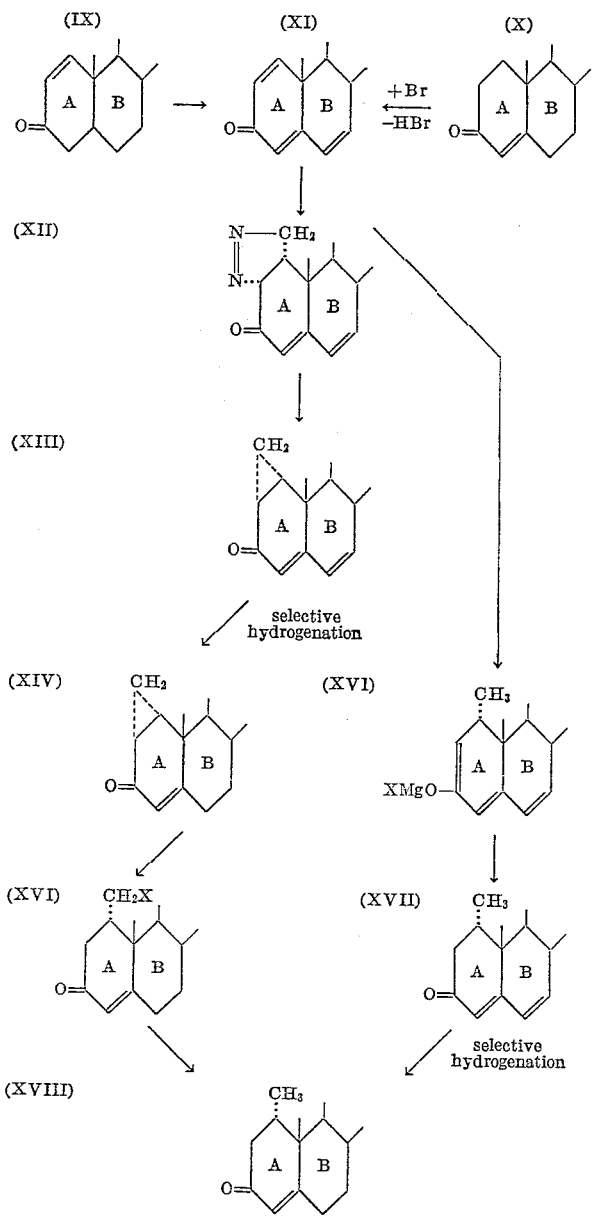

If it is desired in the final product (compound XVIII) to have any present hydroxyl group, for example in the 17-position, in esterified or etherified condition, it is naturally possible to start either with compounds in which the hydroxyl group is already in etherified or esterified condition, or to start with compounds which contain the free hydroxyl group and to esterify or etherify the resulting compound after carrying out the method of the invention.

The 1α-methyl-compounds produced by the method of the present invention are extremely valuable either themselves per se for therapeutic purposes or as intermediate products for the production of valuable steroids. In general these compounds have the same pharmacological properties as the corresponding compounds which do not contain a 1α-methyl group, however, the presence of the 1α-methyl group having the effect of improving the activity thereof.

Thus, for example, 1α-methyl-androstane-17β-ol-3-one-17-acetate (and even already the 1α-chloromethyl-androstane-17β-ol-3-one-17-acetate) exhibit a very strong androgenic and simultaneously a strong anabolic activity upon subcutaneous administration to castrated male rats. The free 1α-methyl-androstane-17β-ol-3-one is in animal tests upon subcutaneous administration to rats stand to have an anabolic activity which is approximately 4.8 times as great as the same compound which is not methylated in the 1-position, which compound is sold commercially under the trade name of "Anaboleen."

Also the 1α-methyl-Δ⁴-androstene-17β-ol-3-one is anabolically active. Its 17 esters are still more active in this direction. Thus, its acetate in a dose of 12×1000γ (subcutaneously) in rats is anabolically as active as 1-methyl-Δ¹-androstene-17β - ol - 3 - one-17-acetate or 19-Nor-testosterone-phenyl propionate, however at the same time having only 45% of the undesired androgenic side action of the named comparison substances.

As an example of the use of the compounds produced according to the method of the present invention as intermediate products in the production of pharmaceutically valuable steroids there may be mentioned the conversion of the 1α-methyl-androstane-17β-ol-3-one, or its 17-acetate into the above named 1-methyl-Δ¹-androstene-17β-ol-3-one and its still more anabolically active ester.

The following examples are given to further illustrate the present invention. However, it is to be understood, particularly with respect to the methods of the present invention, that the invention is not meant to be limied to the specific details of the examples.

*Example 1*

1 g. of 1,2α-methylene-androstane-17β-ol-3-one-17-acetate having a melting point of 139–140° C.;

$[\alpha]_D^{26} = +54°$ (CHCl₃; c.=1.00); U.V. $\epsilon_{208}=3,950$ are dissolved in 10 cc. of methylene chloride. The solution is saturated with hydrogen chloride, after 16 hours of standing at room temperature it is diluted with methylene chloride, washed with water until neutral and dried over sodium sulfate. By evaporation of the solvent a residue remains of 1α-chloromethyl-androstane-17β-ol-3 one-17-acetate.

500 mg. of this residue in 20 cc. of ethyl alcohol are heated to boiling with 1 g. of Raney nickel for 4 hours in a reflux condenser. After filtering off the Raney nickel the alcoholic solution is diluted with methylene chloride, washed with water dried over sodium sulfate and evaporated in water to dryness. By recrystallization from hexane there is obtained 50 mg. of 1α-methyl-androstane-17β-ol-3-one-17-acetate having a melting point of 169–170° C. $[\alpha]_D^{26}=+16.7°$ (CHCl₃; c.=0.88).

*Example 2*

200 mg. of 1,2α-methylene-androstane-17β-ol-3-one-17-acetate are dissolved in 20 cc. of methylene chloride. The solution is saturated with hydrogen bromide, stored at room temperature for 30 minutes in a closed container, then washed with water until neutral, dried over sodium sulfate and concentrated under vacuum to dryness. The residue which remains is 1α-bromomethyl-androstane-17β-ol-3-one-17-acetate having a melting point of 135° C. The compound 1α-chloromethyl-androstadiene-17β-ol-3-one-17-acetate may be produced in an analogous manner.

By treatment with Raney nickel as described in Example 1 there is obtained from the residue 1α-methyl-androstane-17β-ol-3-one-17-acetate having a melting point of 169–170° C.

*Example 3*

930 mg. of 1,2α-methylene-androstane-17β-ol-3-one-17-acetate are stirred for 16 hours at 30° C. in 25 cc. of formic acid with 5 g. of potassium iodide. The solution is diluted with methylene chloride, washed with water until neutral, dried over sodium sulfate and evaporated to dryness under vacuum. By recrystallization of the residue from isopropyl ether there is obtained 1108 mg. of 1α-iodomethyl-androstane-17β-ol-3-one-17-acetate having a melting point of 155.5–157.5° C.

$[\alpha]_D^{25}=+27.9°$ (CHCl$_3$; c.=0.955)

790 mg. of 1α-iodomethyl-androstane-17β-ol-3-one-17-acetate are stirred for 4 hours at room temperature in 55 cc. of ethyl alcohol with 2.5 g. of Raney nickel, and then further worked up as described in Example 1. By recrystallization of the crude product from hexane there is obtained 510 mg. of 1α-methyl-androstane-17β-ol-3-one-17-acetate having a melting point of 169–170° C.

500 mg. of 1α-methyl-androstane-17β-ol-3-one-17-acetate are heated for 90 minutes under nitrogen and under refluxing in 5 cc. of 4% methanolic sodium hydroxide solution. It is then stirred into ice water, the precipitated product is filtered off under suction and recrystallized from isopropyl ether. The resulting 1α-methyl-androstane-17β-ol-3-one melts at 203.5–205° C.

$[\alpha]_D^{20}=+17.6°$ (CHCl$_3$; c.=0.875)

Example 4

200 mg. of 1,2α-methylene-Δ$^{4,6}$-androstadiene-17β-ol-3-one-17-acetate, 5 cc. of 98% formic acid and 1 g. of potassium iodide are treated and worked up as described in Example 3. There is recrystallized from isopropyl ether 230 mg. of 1α-iodomethyl-Δ$^{4,6}$-androstadiene-17β-ol-3-one-17-acetate having a melting point of 109.5–111.5° C. $[\alpha]_D^{25}=-17.9°$ (in chloroform c.=0.995).

200 mg. of 1α-iodomethyl-Δ$^{4,6}$-androstadiene-17β-ol-3-one-17-acetate in 15 cc. of ethanol with 600 mg. of Raney nickel are reacted and worked up as described in Example 1. There is recrystallized from isopropyl ether 130 mg. of 1α-methyl-Δ$^{4,6}$-androstadiene-17β-ol-3-one-17-acetate having a melting point of 156–157° C. UV.: $\epsilon_{285}=24,600$.

Example 5

200 mg. of 1,2α-methylene-Δ$^4$-androstene-17β-ol-3-one in 5 cc. of 98% formic acid containing 1 g. of potassium iodide are reacted and worked up as described in Example 3. The resulting crude 1α-iodomethyl-Δ$^4$-androstene-17β-ol-3-one is treated and worked up in 15 cc. of ethanol containing 600 mg. of Raney nickel analogously to the method described in Example 3. There is recrystallized from isopropyl ether 1α-methyl-Δ$^4$-androstene-17β-ol-3-one having a melting point of 190–191° C. The yield is 125 mg. U.V.: $\epsilon_{243}=14,900$.

500 mg. of 1α-methyl-Δ$^4$-androstene-17β-ol-3-one are allowed to stand at room temperature for 16 hours in 2 cc. of pyridine and 2 cc. of acetanhydride. After stirring into ice water there precipitates 1α-methyl-Δ$^4$-androstene-17β-ol-3-one-17-acetate which is filtered off under suction, dried and recrystallized from pentane. The compound melts at 140° C. $[\alpha]_D^{26}=+109°$ (CHCl$_3$; c.=1.00).

Example 6

90 mg. of 1,2α-methylene-Δ$^{4,6}$-pregnadiene-17α-ol-3,20-dione-17-acetate in 2 cc. of formic acid are treated with 450 mg. of potassium iodide as described in Example 3, further worked up, and rubbed with isopropyl ether. There is thus obtained 1α-iodomethyl-Δ$^{4,6}$-pregnadiene-17α-ol-3,20-dione-17-acetate having a melting point of 196–196.5° C. This compound is further treated in 6 cc. of ethanol with 250 mg. of Raney nickel as described in Example 3, and then isolated. There is thus obtained 1α-methyl-Δ$^{4,6}$-pregnadiene-17α-ol-3,20-dione-17-acetate having a melting point from ethyl acetate of 206–207° C. U.V.: $\epsilon_{284}=24,300$.

Example 7

344 mg. of 1,2α-methylene-androstane-17β-ol-3-one-17-acetate are dissolved in 10 cc. of glacial acetic acid and then hydrogenated at room temperature with the addition of 100 mg. of platinum oxide until 2 mol equivalents of hydrogen has been taken up. The catalyst is then filtered off, the reaction mixture is stirred into ice water, extracted with methylene chloride and the methylene chloride phase is washed with sodium bicarbonate solution as well as with water. After drying over sodium sulfate it is concentrated to dryness under vacuum.

The residue is mixed with 17 cc. of absolute toluene and 3.7 cc. of cyclohexanone. Several cc. of the solvent are then distilled off to remove any moisture present and then 186 mg. of aluminum isopropylate and 1.9 cc. of toluene are added thereto during a time period of 5 minutes. The reaction mixture is then heated for 45 minutes while slowly partially distilling off the solvent. It is then diluted with methylene chloride, with 2 normal sulfuric acid and washed with water. The methylene chloride phase is steam distilled off. The residue of the steam distillation is taken up in methylene chloride, the organic phase is dried over sodium sulfate, subsequently concentrated under vacuum after filtering off the drying agent, and the residue is recrystallized from hexane. There is thus obtained 1α-methylandrostane-17β-ol-3-one-17-acetate having a melting point of 169–170° C.

$[\alpha]_D^{26}=+16.7°$ (CHCl$_3$; c.=0.88)

Example 8

2 g. of 1,2α-methylene-androstane-17β-ol-3-one-17-acetate are dissolved in 58 cc. of glacial acetic acid and then hydrogenated at room temperature with the addition of 500 mg. of platinum oxide. When no more hydrogen is being taken up the the reaction mixture is filtered free of the catalyst, stirred into ice water and the precipitated product is filtered off. It is then dried under vacuum at 70° C. there is thus obtined 1.88 g. of crude 1α-methyl-androstane-3ξ,17β-diol-17-acetate which is reacted under stirring in 30 cc. of acetone with 1.3 cc. of chromic acid solution (chromic acid solution: 267 g. of chromium trioxide, 230 cc. of concentrated sulfuric acid, 400 cc. of water to dilute 1 liter). It is stirred into ice water, the precipitated product is filtered off under suction, washed, dried and recrystallized from hexane. There is thus obtained 1.27 g. of 1α-methyl-androstane-17β-ol-3-one-17-acetate having a melting point of 169–169.5° C.

Example 9

6.3 cc. of methyl iodide are slowly added dropwise to 2 g. of magnesium shavings and 70 cc. of absolute ether, at room temperature under stirring and under nitrogen atmosphere. After about 30 minutes 120 cc. of absolute tetrahydrofurane are slowly added thereto and subsequently liquid is distilled off until a boiling point of 62° C. is reached. After cooling to room temperature 400 mg. of cuprous chloride are added. 5.77 g. of Δ$^1$-androstene-17β-ol-3-one dissolved in 30 cc. of absolute tetrahydrofurane are then slowly added dropwise. The resulting precipitate is maintained in a stirrable condition by the addition of 120 cc. of absolute tetrahydrofurane. After 30 minutes of reaction time the reaction mixture is cooled to 0° C., the excess Grignard reagent is reacted with saturated ammonium chloride solution, diluted with ether and the aqueous phase is separated. The ethereal phase is washed sequentially with aqueous sodium thiosulfate solution, saturated ammonium chloride solution and water. It is then dried over sodium sulfate and concentrated under vacuum to dryness. The residue is recrystallized from ethyl acetate. There is thus obtained 1α-methyl-androstane-17β-ol-3-one having a melting point of 203.5–205° C. $[\alpha]_D^{20}=+17.6$ (CHCl$_3$; c.=0.875). The yield corresponds to 65% of the theoretical (without working up the mother liquor).

Example 10

A Grignard solution is produced as described in Example 9 from 200 mg. of magnesium turnings, 7 cc. of absolute ether and 0.55 cc. of methyliodide. 12 cc. of absolute tetrahydrofurane are then added thereto and 11 cc. of liquid are distilled off. A solution of 661 mg. of Δ$^1$-androstene-17β-ol-3-one-17-acetate in 5 cc. of absolute tetrahydrofurane are then added dropwise to the Grignard reaction mixture. After the addition of 10 cc. of tetrahydrofurane the resulting slurry is maintained in stirrable condition. After 30 minutes the reaction mixture is worked up as described in Example 9.

The thus obtained 1α-methyl-androstane-17β-ol-3-one-17-acetate after recrystallization from isopropyl ether melts at 169–170° C.

$[\alpha]_D^{26} = +16.7$ (CHCl$_3$; c.=0.88)

The yield corresponds to 66% of the theoretical. Further amounts can be obtained from the mother liquor by subsequent acetylation thereof.

Example 11

12 cc. of absolute tetrahydrofurane are added to a Grignard solution prepared as described in Example 9 from 200 mg. of magnesium shavings, 7 cc. of absolute ether and 0.55 cc. of methyl iodide, and 11 cc. of liquid is then distilled off. 20 mg. of cuprous chloride are then added thereto at room temperature.

A solution of 605 mg. of 17α-methyl-Δ¹-androstene-17β-ol-3-one in 5 cc. of absolute tetrahydrofurane are then added to the solution. After the addition of 10 cc. of absolute tetrahydrofurane the resulting slurry remains in stirrable condition. After 30 minutes of reaction time the working up proceeds as described in Example 9.

The thus obtained 1,17α-dimethyl-androstane-17β-ol-3-one after recrystallization from isopropyl ether melts at 177–178° C. $[\alpha]_D^{26} = +4.4°$ (CHCl$_3$; c.=0.997). The yield corresponds to 55% of the theoretical (without working up of the mother liquor).

Example 12

Methylbromide is added to 3.063 g. of magnesium shavings in 107 cc. of absolute ether until the metal goes into solution, the addition being made slowly at room temperature. After subsequent addition of 185 cc. of absolute tetrahydrofurane liquid is distilled off until a boiling point of 62° C. is attained. 613 mg. of cuprous chloride are then added thereto at room temperature and 10 g. of Δ¹-androstene-17β-ol-3-one in 35 cc. of tetrahydrofurane are subsequently added. After the addition of 200 cc. the sediment remains in stirrable condition.

After 30 minutes the reaction mixture is further worked up as described in Example 9. The thus obtained residue is allowed to stand overnight in 40 cc. of pyridine and 40 cc. of acetanhydride at room temperature, and is then stirred into ice water. The resulting precipitate is filtered off under suction, dried and recrystallized from isopropyl ether. There is thus obtined 9 g. of 1α-methyl-androstane-17β-ol-3-one-17-acetate having a melting point of 169° C.

Example 13

769 mg. of Δ¹-cholestene-3-one are reacted with methyl-magnesium iodide under the same molar relationships and under the same conditions described in Example 9, further worked up as described in Example 9 and then recrystallized from methanol. There is thus obtained 355 mg. of 1α-methyl-cholestane-3-one having a melting point of 130–131° C.

Example 14

8.42 cc. of methyl iodide are slowly added dropwise to 3.067 g. of magnesium shavings and 107 cc. of absolute ether at room temperature, under stirring and under a nitrogen atmosphere. After about 30 minutes 185 cc. of absolute tetrahydrofurane are added thereto and liquid is subsequently distilled off until a boiling point of 62° C. is reached. After cooling to room temperature 613 mg. of cuprous chloride are added thereto and thereafter 10 g. of Δ¹,⁴,⁶-androstatriene-17β-ol-3-one-17-acetate in 110 cc. of tetrahydrofurane are slowly added. After 30 minutes of reaction time the reaction mixture is cooled to 0° C., the excess Grignard reagent is reacted with saturated ammonium chloride solution, diluted with ether and the aqueous phase is separated.

The ethereal phase is washed one after the other with aqueous sodium thiosulfate solution, saturated ammonium chloride solution and water. It is dried over sodium sulfate and evaporated to dryness under vacuum. The residue is dissolved in 40 cc. of pyridine and 20 cc. of acetic anhydride and allowed to stand at room temperature for 16 hours. It is stirred into ice water, the resulting precipitate is filtered off under suction, dried and recrystallized from isopropyl ether. There is thus obtained 1α-methyl-Δ⁴,⁶-androstadiene-17β-ol-3-one-17-acetate having a melting point of 156–157° C. $[\alpha]_D^{25} = -33.8°$ (in CHCl$_3$, c.=0.9). U.V.: $\epsilon_{286} = 25,800$. The yield corresponds to 65–70% of the theoretical.

4.67 g. of 1α-methyl-Δ⁴,⁶-androstadiene-17β-ol-3-one-17-acetate are dissolved in 273 cc. of methanol and after the addition of 350 mg. of 10% palladium on calcium carbonate as catalyst it is hydrogenated until 1 mol equivalent of hydrogen is taken up. After filtering off the catalyst the solution is reacted with 50 cc. of 2 normal hydrochloric acid and concentrated under vacuum to about one third its volume. It is then diluted with water and extracted with ether. The ethereal solution is washed with water until neutral, dried over sodium sulfate and concentrated. The crude product is heated on a steam bath for 90 minutes in 10 cc. of pyridine and 10 cc. of acetanhydride. The ether is then taken up and the ethereal phase washed with water until neutral. After drying and evaporation of the solution the obtained crude crystalline 1α-methyl-Δ⁴-androstene-17β-ol-3-one-17-acetate melts at 122–129° C. U.V.: $\epsilon_{244} = 13,500$. The yield corresponds to 98% of the theoretical.

The purified 1α-methyl-Δ⁴-androstene-17β-ol-3-one-17-acetate recrystallized from isopropyl ether melts at 138–139° C. U.V.: $\epsilon_{243} = 14,900$. $[\alpha]_D^{26} = +109°$ (in CHCl$_3$, c.=1.00).

Example 15

Δ¹,⁴,⁶-androstatriene-17β-ol-3-one-17-propionate is reacted analogously to the method described in Example 14. Instead of acetanhydride propionic acid anhydride is utilized for the esterification. The esterification time amounts to 88 hours at room temperature. The obtained 1α-methyl-Δ⁴-androstene-17β-ol-3-one-17-propionate after recrystallization from pentane melts at 105–106° C.

Example 16

Δ¹,⁴,⁶-androstatriene-17β-ol-3-one is reacted in the same manner and under the same molar ratios as described in Example 14 with methyl-magnesium iodide and then worked up. The obtained 1α-methyl-Δ⁴,⁶-androstadiene-17β-ol-3-one melts at 205–206° C. U.V.: $\epsilon_{286} = 26,300$.

By hydrogenation analogous to the manner described in Example 14 there is then obtained 1α-methyl-Δ⁴-androstene-17β-ol-3-one melting at 191° C. U.V.: $\epsilon_{244} = 14,600$.

Example 17

Methyl bromide is added to 3.067 g. of magnesium shavings and 107 cc. of absolute ether at room temperature until dissolution of the metal. This solution is reacted with 10 g. of Δ¹,⁴,⁶-androstatriene-17β-ol-3-one-17-acetate as described in Example 14.

There is thus obtained 5.01 g. of 1α-methyl-Δ⁴,⁶-androstadiene-17β-ol-3-one-17-acetate having a melting point of 156–157° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

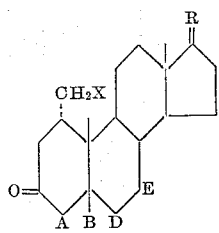

wherein X is selected from the group consisting of hydrogen and halogen; wherein

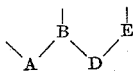

is

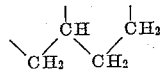

and wherein R is selected from the group consisting of

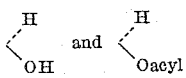

wherein acyl is derived from a lower aliphatic carboxylic acid.

2. 1α-methyl-androstane-17β-ol-3-one.
3. Lower aliphatic carboxylic acid 17-esters of 1α-methyl-androstane-17β-ol-3-one.
4. 1α-iodomethyl-androstane-17β-ol-3-one-17-acetate.
5. 1α-bromomethyl-androstane-17β-ol-3- one - 17 -acetate.
6. 1α-chloromethyl - $\Delta^{4,6}$ - androstadiene-17β-ol-3-one-17-acetate.
7. 1α-iodomethyl-$\Delta^{4,6}$-androstadiene-17β-ol-3-one - 17-acetate.
8. 1α-iodomethyl-$\Delta^4$-androstene-17β-ol-3-one.
9. 1α - iodomethyl-$\Delta^{4,6}$-pregnadiene-17α-ol-3,20-dione-17-acetate.

10. The method which comprises reacting a 1,2α-methylene-3-ketosteroid with a hydrogen halide so as to open the cyclopropane ring and form the corresponding 1α-halomethyl-3-ketosteroid.

11. The method which comprises reacting a 1,2α-methylene-3-ketosteroid with a hydrogen halide so as to open the cyclopropane ring and form the corresponding 1α-halomethyl-3-ketosteroid; and hydrogenating said 1α-halomethyl-3-ketosteroid so as to dehalogenate the same and form the corresponding 1α-methyl-3-ketosteroid.

12. The method which comprises selectively hydrogenating the $\Delta^6$-double bond of a 1,2α-methylene-$\Delta^{4,6}$-3-ketosteroid by means of a palladium catalyst so as to form the corresponding 1,2α-methylene-$\Delta^4$-3-ketosteroid; reacting said 1,2α-methylene-$\Delta^4$-3-ketosteroid with a hydrogen halide so as to open the cyclopropane ring and form the corresponding 1α-halomethyl-$\Delta^4$-3-ketosteroid; and dehalogenating said 1α-halomethyl-$\Delta^4$-3-ketosteroid with hydrogen so as to form the corresponding 1α-methyl-$\Delta^4$-3-ketosteroid.

References Cited

UNITED STATES PATENTS

| | | | |
|---|---|---|---|
| 2,739,974 | 3/1956 | Colton | 260—397.3 |
| 2,908,693 | 10/1959 | Ringold et al. | 260—397.4 |
| 3,032,552 | 5/1962 | Ringold et al. | 260—239.55 |

OTHER REFERENCES

Bowers et al.: Journal of American Chemical Society, vol. 79 (1957), p. 4557 relied on.

Fieser et al.: "Steroids" (1959), Reinhold Publishing Corp., New York, p. 287 relied on.

Ringold et al.: Journal of American Chemical Society, vol. 78 (1956), p. 2477 relied on.

ELBERT L. ROBERTS, *Primary Examiner.*

L. H. GASTON, I. MARCUS, L. GOTTS, M. LIEBMAN, *Examiners.*